INVENTORS.
E. GORIN
P. M. YAVORSKY

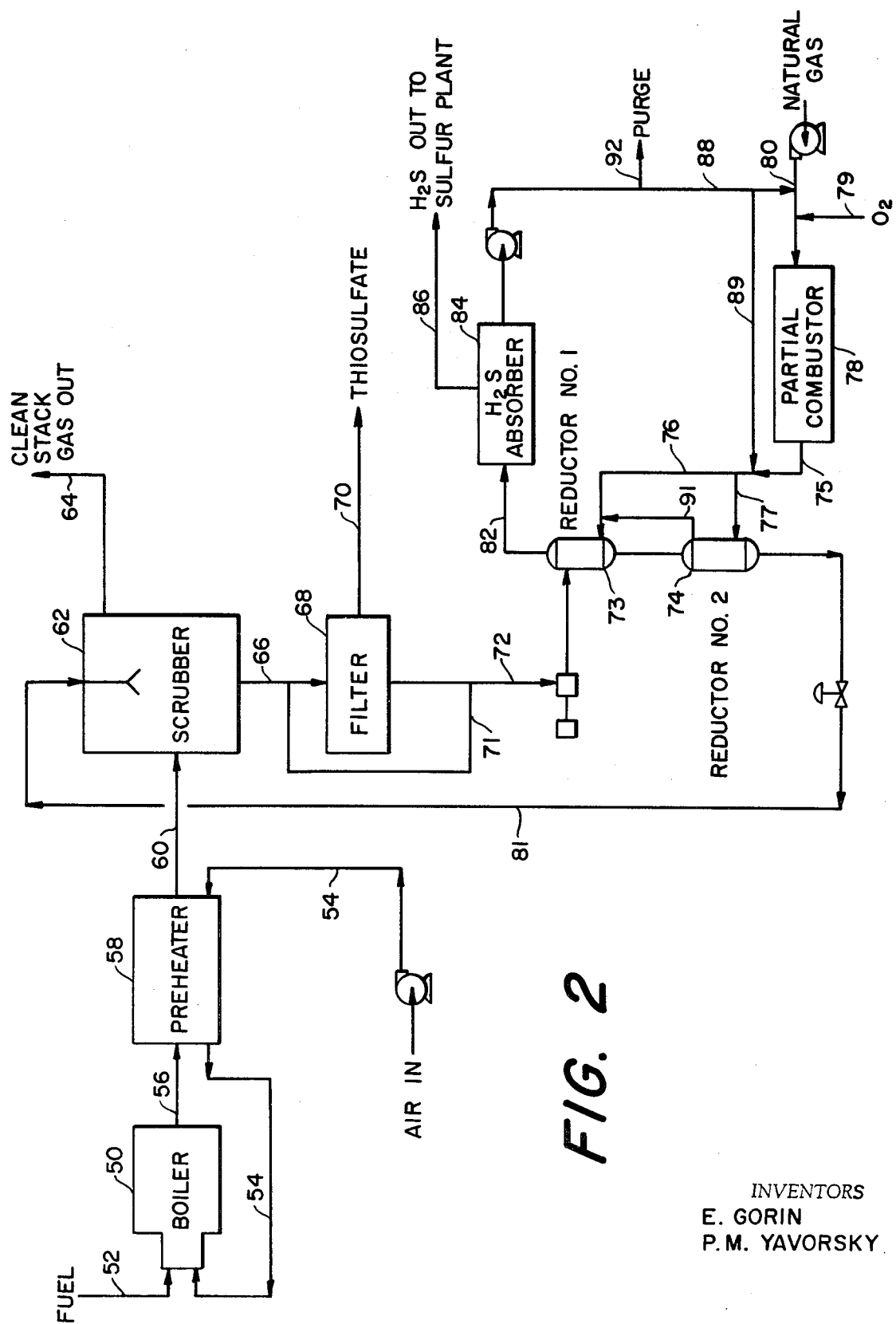

3,687,615
DESULFURIZATION OF FLUE GAS
Everett Gorin, Pittsburgh, and Paul M. Yavorsky, Monongahela, Pa., assignors to Consolidation Coal Company, Pittsburgh, Pa.
Continuation of abandoned application Ser. No. 879,223, Nov. 24, 1969, which is a continuation-in-part of abandoned application Ser. No. 667,479, Sept. 13, 1967. This application Mar. 29, 1971, Ser. No. 128,784
Int. Cl. B01d *53/34;* C01b *17/64;* C07c *53/06*
U.S. Cl. 423—243 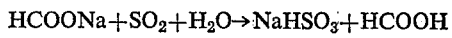 6 Claims

ABSTRACT OF THE DISCLOSURE

Removal of sulfur dioxide from hot flue gas by passing the flue gas in contact with potassium formate, sodium formate, or ammonium formate, in either a molten state or in aqueous solution, at a temperature above 140° F., whereby the sulfur dioxide and the formate react to form principally thiosulfate.

CROSS-REFERENCES TO RELATED APPLICATIONS

This application is a continuation of application, Ser. No. 879,223, filed Nov. 24, 1969, and now abandoned which is a continuation-in-part of application, Ser. No. 667,479, filed Sept. 13, 1967 (now abandoned). Other related applications, filed on Nov. 24, 1969, describing and claiming certain subject matter hereinafter disclosed are an application, Ser. No. 879,244, now Patent No. 3,584,042, filed by P. M. Yavorsky and E. Gorin entitled "Conversion of Thiosulfate to Formate" and an application, Ser. No. 879,225 filed by N. J. Mazzocco, E. Gorin and P. M. Yavorsky entitled "Regeneration of Formate From Thiosulfate" (now abandoned, but replaced by a continuation-in-part application, Ser. No. 47,040, filed June 17, 1970, now Patent No. 3,592,850).

BACKGROUND OF THE INVENTION (1) Field of the invention

The present invention relates to a method of removing sulfur dioxide from gases, particularly from industrial gases which may contain only a very small amount of sulfur dioxide, such as flue gases which are formed in the burning of sulfur-containing coal or oil, and also in certain metallurgical processes.

(2) Description of the prior art

Wet scrubbing of flue gas with sulfur-absorbing reagents is an extremely effective method of removing $SO_2$. For example, the use of soda ash solutions has been shown to effect removal of 95 percent in full-scale plant tests at the Battersea Power Station, England, from flue gases containing ca. 0.1 volume percent $SO_2$. Similarly, high efficiency has been achieved in pilot tests on removal of $SO_2$ by washing with alkali sulfite solutions. See Johnstone, H. F.; Read, H. J.; and Blankmeyer, H. C., Ind. Eng. Chem. 30, 101 (1938). Wet scrubbing has also been investigated with "disposable" weakly alkaline reagents, i.e., water-lime slurries. Tests at the Battersea Power Station indicated highly efficient sulfur removal in this way, but almost as good elimination was obtained with the water alone, apparently due to the natural alkalinity it contained.

The alkali metal and alkaline earth salts of formic acid in aqueous solutions have been proposed as wet absorbents of sulfur dioxide (Japanese Patent No. 172,814, issued May 31, 1946). The sulfur dioxide is absorbed at ambient temperatures below 50° C., according to the following illustrative reaction:

$$HCOONa + SO_2 + H_2O \rightarrow NaHSO_3 + HCOOH$$

The patent further teaches that the sulfur dioxide may be released by simply heating the solution to a temperature above 55° C., and preferably nearer 70° C.

The wet scrubbing methods which operate at low ambient temperatures suffer from the so-called "plume problem." The low buoyancy of the gas resulting from scrubbing at substantially ambient temperatures requires that almost quantitative removal of $SO_2$ be effected. Otherwise, due to poor dispersion of the flue gas and the resultant plume, the ground level contamination may be even worse than without scrubbing. The scrubbed flue gas may be reheated to elevated temperatures before release to the atmosphere, but such reheating is expensive.

In most utility stations, the flue gas exiting from the air preheater and entering the stack has a temperature in the range of 250-350° F. The high temperature facilitates plume rise. It would be desirable to scrub this gas for $SO_2$ removal without substantial cooling, to insure plume rise without costly reheat. Accordingly, the scrubbing medium should preferably be a liquid which is effectively operative in, or as near this temperature range as possible.

SUMMARY OF THE INVENTION

In accordance with the present invention, a process is provided for removing sulfur dioxide from hot flue gas which comprises passing the hot flue gas in contact with sodium formate, potassium formate, or ammonium formate, preferably in a liquid state, at a temperature above 140° F., but below the decomposition temperature of the formate, and preferably below 475° F. The formate may be dissolved in any chemically inert solvent which is liquid within the above temperature range. Water is the preferred solvent when a solvent is used. However, the salt may be used in the molten state rather than in a solvent. Likewise, suitable mixtures of the formates may be used. For example, we have found a suitable wet absorbent to be the eutectic mixture containing 96 percent potassium formate and 4 percent sodium formate which melts at 320° F., 13° F. below the melting point of the pure potassium salt. The sulfur dioxide in the flue gas reacts very rapidly and completely with the formate to form principally the corresponding alkali metal thiosulfate at temperatures above 140° F. and up to 475° F., as shown in the following equation:

(1) 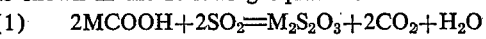 $2MCOOH + 2SO_2 = M_2S_2O_3 + 2CO_2 + H_2O$ where M is Na, K or $NH_4$.

The reaction is an oxidation-reduction reaction rather than an acid-base reaction, as set forth in the above-cited Japanese patent. The reaction of formate and sulfur dioxide under the recited conditions is thus a method of making the thiosulfate.

At temperatures above 475° F., secondary reactions of the thiosulfate formed by reaction (1) occur, and increase in rate as the temperature is increased. Among such secondary reactions is the following:

(2) 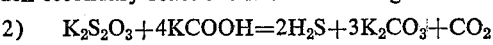 $K_2S_2O_3 + 4KCOOH = 2H_2S + 3K_2CO_3 + CO_2$

It is undesirable in most instances to replace the $SO_2$ in the flue gas by $H_2S$. Accordingly, the temperature is generally maintained below 475° F. during the $SO_2$ absorption cycle.

Significant quantities of $M_2S$, MHS, minor amounts of $M_2SO_4$, and occasionally some $M_2SO_3$ and elemental sulfur may also be produced. The amounts of these by-products depend on the conditions employed in the absorption or scrubbing step. The formation of by-products is minimized by reduction of temperature and residence time. At temperatures below 400° F., the formation of $H_2S$ in the scrubbing reaction appears to be completely inhibited, especially when $M_2CO_3$ is present in the formate. For this reason, its presence may be desirable, though it is clear that carbonate is not necessary for absorption of $SO_2$ by the formates.

Both sodium thiosulfate and potassium thiosulfate are useful per se as chemical agents in industry. In particular, they are useful as fixing agents in developing solutions used in photography, sodium thiosulfate being the well-known "hypo." Ammonium thiosulfate may be readily converted to the sulfate which is used as a fertilizer. Thus, the thiosulfate products of Reaction (1) may be marketable as such, after suitable purification.

If, on the other hand, regeneration of the thiosulfate product to formate is desired to permit its reuse in the $SO_2$-absorbing system, it may be accomplished by reduction (at least in the case of sodium or potassium thiosulfate), as will be more fully discussed later. However, such regeneration does not form part of the present invention which is concerned solely with the remarkable effectiveness of the selected formates as absorbents for $SO_2$ at elevated temperatures.

Generally speaking, we prefer to use aqueous formate solutions rather than the molten salts. The three basic advantages of the aqueous system are (1) complete elimination of evolution of $H_2S$ into the scrubbed flue gas (which sometimes happens in the case of the melt system at high temperature), (2) operation under conditions where no insoluble salts are precipitated, and (3) a much less serious corrosion problem.

The aqueous formate solutions may be conveniently used within the temperature range 140 to 250° F., preferably within the range 150 to 225° F. The higher the operating temperature, the higher the salt concentration that is required to prevent evaporation. Because of the very high solubility of potassium and ammonium formates, concentrations up to 90 weight percent may be used, but 70 to 85 weight percent is preferred over the temperature range 170 to 200° F. In the case of aqueous sodium formate, lower concentrations are used because of the lower solubility of the sodium salt. Concentrations of about 55 to 60 weight percent are preferred over the temperature range of about 160 to 170° F.

The use of the formates in molten form does permit efficient removal of $SO_2$ from hot flue gas without any cooling of the flue gas. The melting point of potassium formate is 333° F. The $SO_2$ absorption may be conducted at a temperature above 350° F., but preferably below 475° F. Above 475° F., some $H_2S$ is evident, thus defeating the primary purpose of desulfurizing the flue gas. Somewhat lower temperatures may be achieved in potassium formate melt systems if other salts are added which depress the melting point of the potassium formate. The addition of small amounts of sodium formate effects such a melting point depression. Likewise, operation at somewhat reduced temperatures is possible by addition of small amounts of water. For example, we have found that 98% KCOOH–2% $H_2O$ forms a homogeneous liquid at 310° F. and has a sufficiently low vapor pressure of water at the above temperature to be useful as a scrubbing fluid for flue gas.

The melting point of sodium formate is 489° F., which is below its initial thermal decomposition point of 600° F. However, to avoid introduction of substantial amounts of $H_2S$ into the flue gas, it is necessary to operate with sodium formate at temperatures below 475° F. Thus, its admixtures with other salts or inert solvents which depress the melting point are used.

The melting point of ammonium formate is 240° F., which is above the temperature at which it starts to decompose, i.e. 170° F. Accordingly, for all practical purposes, its use as absorbent is limited to temperatures below 170° F. and to solutions, as distinguished from melts.

The process of the present invention is directed preferably to the use of the recited formates in a liquid state as wet absorbents for $SO_2$. The process is founded on our discovery that $SO_2$ reacts with the recited formates at temperatures above 140° F. to form the corresponding thiosulfates. This new reaction is obviously not dependent upon the physical form of the reactants. Hence, the recited formates, suitably supported on inert carriers, could serve as dry absorbents for $SO_2$, as distinguished from the wet absorbents of the process of this invention.

EXPERIMENTAL RESULTS

The data reported below in Tables I, II, and III were obtained in $SO_2$ absorption experiments conducted in the laboratory. A simulated flue gas of known composition was passed upwardly through a heated $SO_2$ absorbent (of known composition) in a liquid state. Contact time between gas and liquid was less than 2 seconds. The off-gases and absorbent products were collected and analyzed by conventional techniques.

TABLE I

| Run No. | $SO_2$ absorbent system (gms.) | | | Feed gas (volume percent) | | Conditions | | |
|---|---|---|---|---|---|---|---|---|
| | KCOOH | $K_2CO_3$ | $H_2O$ | $SO_2$ | $N_2$ | Gas rate (liters/hr.) | Run duration (hrs.) | Temp. (° F.) |
| 1 | 100 | 25 | | 0.83 | [1] 94.0 | 34.0 | 3.00 | 450 |
| 2 | 87.3 | | | 0.83 | [1] 94.0 | 34.0 | 3.00 | 450 |
| 3 | 100 | 25 | | 1.11 | 98.89 | 34.0 | 1.835 | 350 |
| 4 | 80 | 20 | | 5.56 | 94.44 | 34.0 | 0.583 | 350 |
| 5 | 100 | | | 5.56 | 94.44 | 34.0 | 0.450 | 350 |
| 6 | 80 | 20 | 18 | 0.26 | [2] 81.23 | 34.0 | 2.50 | 225 |
| 7 | 100 | | 20 | 0.26 | [2] 81.23 | 34.0 | 0.667 | 225 |
| 8 | 100 | | 20 | 3.00 | 97.00 | 34.0 | 1.75 | 175 |
| 9 | 100 | | 20 | 3.00 | 97.00 | 34.0 | 2.00 | 150 |
| 10 | 100 | | | 5.56 | 94.44 | 34.0 | 1.300 | 450 |
| 11 | 100 | 25 | | 5.56 | 94.44 | 34.0 | 1.250 | 450 |
| 12 | 100 | | | 5.56 | 94.44 | 34.0 | 1.200 | 350 |
| 13 | 100 | | | 5.56 | 94.44 | 34.0 | 0.700 | 350 |
| 14 | 100 | | | 5.56 | 94.44 | 34.0 | 1.150 | 350 |
| 15 | 100 | | | 5.56 | 94.44 | 34.0 | 1.000 | 350 |
| 16 | 100 | 25 | | 5.56 | 94.44 | 34.0 | 1.250 | 350 |
| 17 | 225 | | 25 | 4.10 | 95.90 | 68.0 | 5.22 | 250 |

[1] Feed gas also had 0.97% $CO_2$, 0.93% CO, 3.28% $O_2$.
[2] Feed gas also had 12.1% $CO_2$, 6.41% $O_2$.

TABLE II

| Run No. | Cumulative off-gas analysis | | | | Scrubbing results | |
|---|---|---|---|---|---|---|
| | SO₂ (gms.) | CO₂ (gms.) | H₂S (gms.) | Molar ratio CO₂ off/ SO₂ in | Percent SO₂ absorbed | Total S added to melt (gms.) |
| 1 | [1] 0.00 | | | | 100.0 | 1.20 |
| 2 | [1] 0.00 | | | | 100.0 | 1.20 |
| 3 | 0.00 | 1.36 | | 1.00 | 100.0 | 0.99 |
| 4 | 0.00 | 2.16 | | 1.0 | 100.0 | 1.57 |
| 5 | 0.00 | 1.84 | | 1.1 | 100.0 | 1.21 |
| 6 | [1] 0.00 | | | | 100.0 | 0.32 |
| 7 | [1] 0.00 | | | | 100.0 | 0.084 |
| 8 | 0.00 | | | | 100.0 | 2.55 |
| 9 | 0.00 | | | | 100.0 | 2.91 |
| 10 | 0.00 | 5.26 | 0.09 | 1.1 | 100.0 | 3.50 |
| 11 | 0.00 | 4.65 | 0.00 | 1.0 | 100.0 | 3.38 |
| 12 | 0.00 | 4.45 | Trace | 1.0 | 100.0 | 3.21 |
| 13 | 0.00 | 2.60 | | 1.0 | 100.0 | 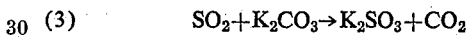 |
| 14 | 0.00 | 4.27 | [2] 0.32 | 1.0 | 100.0 | 1.89 ⎱ = 5.00 3.11 ⎰ |
| 15 | 0.00 | 3.71 | | 1.0 | 100.0 | 2.70 |
| 16 | 0.00 | 4.65 | 0.00 | 1.0 | 100.0 | 3.3 |
| 17 | 5.08 | 21.60 | 0.00 | 1.0 | [3] 75.6 | 15.7 |

[1] Oxygen analyzed in off-gas. No change. Oxygen out = oxygen in.
[2] Products of Runs 13 and 14 combined for analyses.
[3] SO₂ absorption was incomplete due to poor contact of gas with liquid.

TABLE III.—SCRUBBING PRODUCT ANALYSES

| | Total sulfur (gms.) | | Percent of total sulfur [3] in form of— | | |
|---|---|---|---|---|---|
| No. | Added [1] | Cumulative [2] | $K_2CO_3$ | $K_2S_2O_3$ | $H_2S$ |
| 9 | 2.91 | | | 53.6 | |
| 10 | 3.50 | 3.51 | 1.59 | 89.14 | 2.37 |
| 11 | 3.38 | 3.46 | 27.5 | 29.23 | 0.00 |
| 12 | 3.21 | 3.06 | 1.51 | 81.31 | 0.00 |
| 13 | | | | | |
| 14 | [4] 5.00 | 5.04 | [4] 5.81 | 71.23 | 6.02 |
| 15 | 2.70 | | | | |
| 16 | 3.38 | 3.38 | 24.8 | 27.9 | 0.00 |
| 17 | 15.7 | 15.7 | 26.4 | 92.55 | 0.00 |

[1] Total sulfur calculated from the SO₂ absorbed.
[2] Cumulative sulfur—obtained by analysis.
[3] Balance of sulfur in other sulfur compounds, e.g. K₂S and K₂SO₄.
[4] Products of Runs 13 and 14 combined.

The $SO_2$ scrubbing runs presented in the above tables are in two groups. Runs 1 through 8 were made to test the efficacy of potassium formate, either alone or in admixture with potassium carbonate, for $SO_2$ absorption. This was done for molten salts (Runs 1 to 5 inclusive) and for concentrated aqueous solutions (Runs 6 to 8). Then, when the efficacy of all systems was found to be high, it was desirable to find out what the products of the scrubbing reactions were. Hence, for the second group, Runs 9 through 17, analyses were conducted on the products.

It is clear from the data for the first group of runs (Runs 1-8) in Tables I and II, that blends of potassium carbonate in molten potassium formate absorb $SO_2$ very efficiently (100%) at 450° F. (Run 1) and 350° F. (Runs 3 and 4). The aqueous solution of formate and carbonate also is an efficient scrubber (Run 6) even at the lower temperature of 225° F. However, it is also immediately clear that the companion runs (Nos. 2, 5, 7 and 8) that have only formate and no carbonate, are just as efficient, with 100% absorption of the $SO_2$ from simulated flue gases and from $SO_2/N_2$ blends. When high concentrations of $SO_2$ were used in the feed (Runs 4 and 5), the gas feed tube plugged where it entered the melt. This indicates that the reaction with $SO_2$ is very rapid, because the localized solidification of the relatively insoluble products occurs at the gas inlet site. Also, the maximum residence time could not have been more than a second or two, which was the observed bubble rise-time in the scrubbing medium. Still, complete removal of $SO_2$ was always attained, with the exception of Run 17. The incomplete absorption in Run 17 resulted from poor liquid-gas contact because the gas was introduced above the liquid, rather than bubbled through.

As shown in Runs 3, 4 and 5, the evolved $CO_2$ was measured and found to be equal (molar-wise) to the $SO_2$ absorbed when carbonate was present, but just slightly more than when only formate was present. Later similar runs at 350° F. (12 through 16) show the molar ratio of $CO_2$-off over $SO_2$-in to be 1.0. Thus, evolution of $CO_2$ cannot be used to distinguish whether the reaction is with carbonate or formate in cases where both are present, since it evolves from formate as well as from the expected carbonate reaction, (3) $$SO_2 + K_2CO_3 \rightarrow K_2SO_3 + CO_2$$

In Runs 1 and 2, CO was analyzed for in the off-gas. No increase over feed CO content was found. Thus, CO is not a reaction product. Likewise, analyses for oxalate in the salt product showed that it is not produced from formate. Oxygen was present in the feed gas for Runs 1, 2, 6 and 7. For these runs, $O_2$ analysis of the off-gas showed no reduction of $O_2$ as compared to the feed. Thus, residual $O_2$ in flue gas will not adversely react with formate-based liquid scrubbers.

The analyses of sulfur forms in the scrubbing products, as presented in Table III, consistently show that thiosulfate is the major product from reaction of $SO_2$ with formate. Coupling this fact with the observation that a mole of $CO_2$ evolves per mole of $SO_2$ absorbed indicates that the major absorption reaction with formate is reaction (1), namely:

$$2MCOOH + 2SO_2 \rightarrow M_2S_2O_3 + 2CO_2 + H_2O$$

At 350° F. (Run 14) and at 450° F. (Run 10), both with molten formate only, some $H_2S$ was found in the off-gas from scrubbing. This, of course, is undesirable in scrubbed stack gas, even if it is only a few percent of the original $SO_2$ content. No $H_2S$ evolution was observed when $K_2CO_3$ was present, or when aqueous formate solutions were used at 250° F. or less (Run 17). In general, the sulfur distribution is altered in the scrubbing products when carbonate is present. The proportion of thiosulfate is then much less, while $M_2S$ increases. Also, note that the carbonate is not consumed, as seen in Runs 11 and 16, since the amount of carbonate in the product is equal to that in the initial scrubbing blend. Thus, the reactivity of formate with $SO_2$ greatly exceeds that of carbonate.

Similar results to those obtained with potassium formate were obtained with both sodium formate and ammonium formate, when used under conditions which recognized the differences in their respective physical properties, namely melting points, decomposition points, and solubilities, as previously set forth. In all cases where good gas-to-liquid contact was obtained, essentially 100 percent absorption of $SO_2$ was obtained, with thiosulfate being always the principal product.

DESCRIPTION OF THE DRAWINGS

For a better understanding of our invention, its objects and advantages, reference should be had to the accompanying drawings in which FIG. 2 is a schematic flowsheet of a modification of the process of this invention.

DETAILED DESCRIPTION OF THE PREFERRED EMBODIMENT

Figure 1:
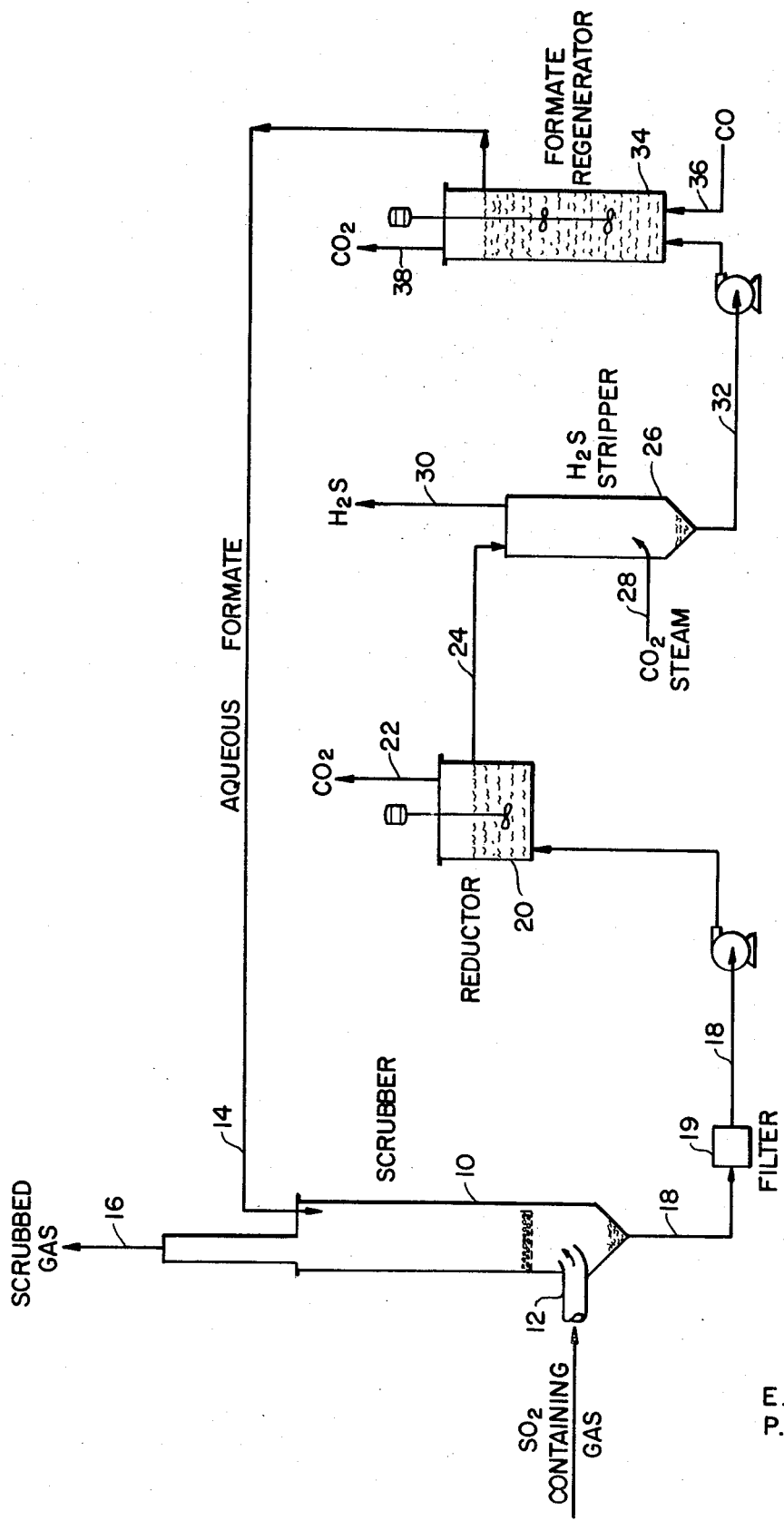
FIG. 1 is a schematic flowsheet of the preferred embodiment of our process.

Referring to FIG. 1 of the drawings, there is shown a flowsheet of a process which includes the preferred embodiment of the present invention, namely the absorption of $SO_2$ by means of formates in the liquid state, as well as the preferred embodiment of a regeneration procedure. We prefer to regenerate the formate from the product thiosulfate, rather than recover the product thiosulfate for sale or other use, as earlier described. Accordingly, we have included the specific regeneration procedure we prefer to use, even though it does not form part of the present invention, and is more fully described and claimed in application, Ser. No. 879,225 filed Nov. 24, 1969 by Messrs. Nestor J. Mazzocco, Everett Gorin and Paul M. Yavorsky (now abandoned, but replaced by a continuation-in-part application, Ser. No. 47,040 filed June 17, 1970).

The $SO_2$-containing gas is introduced into the bottom of a scrubber 10 through a conduit 12, while concentrated aqueous potassium formate (e.g. 85%) is fed into the top of the scrubber through a conduit 14. The scrubber may be any conventional gas-liquid scrubbing tower designed to assure contact of the $SO_2$-containing gas at elevated temperatures with the selected formate in a liquid state. We prefer to use a jiggling bed of marbles through which the gas and liquid pass in countercurrent flow relationship. The temperature within the scrubber is preferably maintained between 170 and 200° F. when concentrated aqueous potassium formate is the absorbing agent. This temperature range has the advantage of eliminating the need for reheat of the scrubbed gases when they are released to the atmosphere. The scrubbed gas, freed of $SO_2$, or substantially so, is discharged through a stack 16 as clean stack gas.

The relative amounts of $SO_2$-containing gas and formate passing through the scrubber are regulated to provide for considerable excess of the formate, so that less than 25 percent by weight of the formate is converted to the thiosulfate in accordance with the reaction expressed by Equation 1. Accordingly, the major constituents of the effluent liquid stream leaving the bottom of the scrubber through conduit 18 are aqueous potassium formate and potassium thiosulfate. These are pumped by conduit 18 through a filter 19 (to remove any entrained solids, e.g. ash or insoluble by-products) to a stirred Reductor vessel 20 wherein the excess formate is used to reduce the thiosulfate to $K_2CO_3$ and KHS according to the following reaction:

(4)  $K_2S_2O_3 + 4KCOOH = 2KHS$
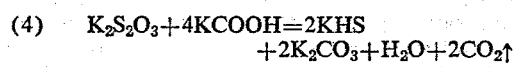
$+ 2K_2CO_3 + H_2O + 2CO_2\uparrow$

The temperature within the Reductor is maintained at about 540° F. while the pressure, which is self-generated, is held at about 500 p.s.i.g. The required reaction time is about 20 minutes. The gaseous product $CO_2$ is discharged from the Reductor through a pipe 22.

The products from the Reductor which are in aqueous solution are transferred through a conduit 24 to a so-called $H_2S$ Stripper multiple plate tower 26, into the bottom of which is also introduced a stream of $CO_2$ and steam via a conduit 28. The $CO_2$ and steam react with the KHS in the aqueous solution at the maintained temperature of 230–270° F. and 10 p.s.i.g. to produce $K_2CO_3$, according to the following reactions:

(5)  $2KHS + CO_2 + H_2O = K_2CO_3 + H_2S\uparrow$

The gaseous $H_2S$ is discharged through a stack 30 to a suitable recovery or processing plant (not shown). The aqueous solution of $K_2CO_3$ is pumped through a conduit 32 to a stirred Formate Regenerator vessel 34 where the aqueous $K_2CO_3$ is reconverted to aqueous KCOOH by reaction with CO introduced through a conduit 36, according to the following equation:

(6)  $K_2CO_3 + 2CO + H_2O = 2KCOOH + CO_2\uparrow$
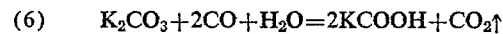

The temperature maintained in the Regenerator is about 540° F., and the pressure held at about 1000 p.s.i.g. The residence time is about one hour. The gaseous product $CO_2$ is discharged through a stack 38, while the regenerated aqueous formate is recycled to the scrubber through the conduit 14, after suitable adjustment of its concentration to 85 percent in the aqueous solution.

DETAILED DESCRIPTION OF ALTERNATIVE EMBODIMENT

Referring to FIG. 2, an alternative embodiment of the process of the present invention is shown in which the formate in molten form is used as the $SO_2$-absorbing agent. A different regeneration procedure from that shown in FIG. 1 is used to demonstrate that there are other ways available for regenerating the formate. Numeral 50 designates any conventional steam boiler heated by the combustion of a sulfur-containing fuel, e.g. coal, introduced through a conduit 52 with air introduced through a pipe 54. Hot flue gas containing $SO_2$ is conducted by a pipe 56 to an air preheater 58 for heat exchange with the incoming air carried by the pipe 54. The flue gas is then passed through a pipe 60 to a scrubber 62 for removal of $SO_2$, in a manner to be more fully described below. The resulting flue gas of reduced or zero $SO_2$ content is discharged through a stack 64.

The scrubber 62 is any conventional gas-liquid scrubbing tower designed to assure contact of the hot flue gas with the selected formate, in this instance potassium formate in a molten state, at a temperature between the melting point and 400° F., e.g. 350° F. The hot flue gas is scrubbed free, or substantially so, of $SO_2$ in the scrubber 62 by contact with the molten potassium formate. The $SO_2$-free gas is discharged through the stack 64 as clean stack gas. Since the stack gas is at an elevated temperature, its plume does not fall to ground level, but rises and diffuses into the upper atmosphere.

The chemical reaction occurring in the scrubber 62 is that set forth above in Equation 1. The $CO_2$ produced in the reaction is discharged with the stack gas through stack 64. The reaction is suitably regulated to provide for the conversion of between about 7 to 25 percent by weight of the formate to the thiosulfate. The solubility of the thiosulfate in the molten formate is about 7 percent, so that the product leaving the scrubber is in the form of a slurry of the undissolved thiosulfate in the formate melt. If it is desired to recover any thiosulfate for use per se, for instance as a photographic fixing agent, then the slurry may be withdrawn from the scrubber 62 by a pipe 66 to a filter 68 where the thiosulfate and other entrained solids may be filtered and discharged through a conduit 70, for further purification of the thiosulfate.

However, we prefer to regenerate formate from the thiosulfate for reuse in the treatment of flue gas. Accordingly, the $SO_2$-free thiosulfate-formate slurry is pumped around the filter 68 by a by-pass line 71 to a pipe 72 which leads to the first of two reduction zones suitably housed in interconnected vessels designated by the numerals 73 and 74, respectively, and also identified by the legends Reductor No. 1 and Reductor No. 2, respectively. A suitably regulated stream of CO and $H_2$ is fed to each of the Reductors by a main pipe 75 with spur pipelines 76 and 77 leading respectively to vessels 73 and 74. The stream of CO and $H_2$ is blended with recycle gas from line 89. The main pipe 75 is supplied with the reducing gas CO and $H_2$ produced in any suitable manner. The preferred gas composition is one that has a $CO/H_2$ mole ratio of about 1:1.

Such a gas may be generated in a partial combustion zone 78 using oxygen from line 79 and natural gas from line 80, blended with a $CO_2$-rich recycle gas from line 88.

Other suitable means of supplying $CO/H_2$ may be used, such as partial combustion of fuel oil, catalytic reforming of natural gas with carbon dioxide-steam mixtures and by steam gasification of coal or coal char.

The partial combustor 78 may be operated at the same or preferably somewhat lower pressure level than the Reductors Nos. 1 and 2. In the latter case, a compressor, not shown, would be installed in line 75 which delivers $CO/H_2$ gas to the regeneration system.

The reactions conducted in the Reductor No. 1 are those set forth in the following equations, where molten potassium formate is the selected absorbent:

(7) $K_2S_2O_3 + 4KCOOH = 2K_2S + K_2CO_3 + 3CO_2 + 2H_2O$ (8) $K_2S + H_2O + CO_2 = K_2CO_3 + H_2S$

The preferred operating conditions for this reduction zone are as follows: a temperature between 500 and 700° F. and a minimum $CO + H_2$ pressure correlated with temperature as shown in Table IV below.

TABLE IV.—Minimum CO and $H_2$ Pressure

| Temperature, °F.: | $CO + H_2$ pressure (p.s.i.) |
|---|---|
| 600 | 435 |
| 635 | 650 |
| 670 | 890 |
| 700 | 1230 |

The reaction conducted in Reductor No. 2 is that set forth below in Equation 9, where the carbonate is converted back to formate.

(9) $K_2CO_3 + CO + H_2 = 2KCOOH$

The preferred operating conditions for this second reduction zone are as follows: a temperature between 600 and 700° F. and a pressure about 1000 p.s.i.g. above the equilibrium pressures given in Table IV. The regenerated formate, together with unreacted formate, is recycled by pipe 81 to the scrubber 62. The effluent gases produced in Reductor No. 2 are passed to Reductor No. 1 through line 91. The effluent gases from Reductor No. 1 are passed by pipe 82 to an $H_2S$ absorber 84 where the $H_2S$ is selectively removed from the effluent gases. The $H_2S$ is conducted by a pipe 86 to a sulfur recovery plant. The $H_2S$-free effluent gases are recycled in part by pipes 88 and 89 back to the Reductors Nos. 1 and 2. Another part is passed through pipes 88 and 80 to the partial combustion unit 78 where it is blended with natural gas feed. Finally, some of the gas is purged from the system through line 92 to prevent accumulation of impurities.

According to the provisions of the patent statutes, we have explained the principle, preferred construction, and mode of operation of our invention and have illustrated and described what we now consider to represent its best embodiment. However, we desire to have it understood that, within the scope of the appended claims, the invention may be practiced otherwise than as specifically illustrated and described.

We claim:

1. A method of reducing the sulfur dioxide content of flue gas to reduce air pollution comprising passing said flue gas containing sulfur dioxide into contact with a formate selected from the group consisting of sodium formate, potassium formate, and ammonium formate, in a liquid state, at a temperature above 140° F., but below the decomposition temperature of the selected formate.

2. The method according to claim 1 in which the temperature is below 475° F.

3. The method according to claim 2 in which the formate is in aqueous solution.

4. The method according to claim 3 in which the temperature is between 150 and 225° F.

5. The method according to claim 2 in which the formate is aqueous potassium formate and the temperature is between 170 and 200° F.

6. The method according to claim 2 in which the formate is in admixture with the corresponding carbonate.

References Cited
UNITED STATES PATENTS

| | | | |
|---|---|---|---|
| 1,036,705 | 8/1912 | Portheim | 23—116 |
| 1,166,160 | 12/1915 | Portheim | 23—116 |
| 2,010,615 | 8/1935 | Vanderbilt et al. | 23—116 |
| 2,031,802 | 2/1936 | Tyrer | 23—178 |
| 2,142,987 | 1/1939 | Bacow et al. | 23—178 |
| 3,411,875 | 1/1968 | Yoshikawa et al. | 23—116 |
| 3,576,598 | 4/1971 | Plentovich et al. | 23—116 |
| 3,584,042 | 6/1971 | Yavorsky et al. | 23—115 X |
| 3,592,850 | 7/1971 | Mazzocco et al. | 23—115 X |

OTHER REFERENCES

Goliath et al.: "Mechanism of Reduction of Sulfur Dioxide by Formic Acid," Acta Chemica Scandinavica, vol. 16, No. 3, 1962, pp. 570–574.

EARL C. THOMAS, Primary Examiner

U.S. Cl. X.R.

23—1 D, 2 S, 178 S; 423—514; 260—542

PO-1050
(5/69)

UNITED STATES PATENT OFFICE
CERTIFICATE OF CORRECTION

Patent No. 3,687,615            Dated August 29, 1972

Inventor(s) Everett Gorin and Paul M. Yavorsky

It is certified that error appears in the above-identified patent and that said Letters Patent are hereby corrected as shown below:

In Column 1, line 31:    Ser. No. 879,244 should read --879,224--

In Column 2, line 48:    After 320°F., insert --i.e.,--

In Column 5, Table II:    For "3.3", read --3.38-- and
(Last column)    for "15.7$_2$", read --15.72--

In Column 7, line 72:    "reactions:" should read --reaction:--

Signed and sealed this 6th day of February 1973.

(SEAL)
Attest:

EDWARD M. FLETCHER, JR.            ROBERT GOTTSCHALK
Attesting Officer                  Commissioner of Patents